US008350669B2

(12) United States Patent
Magner et al.

(10) Patent No.: US 8,350,669 B2

(45) Date of Patent: Jan. 8, 2013

(54) ELECTRONIC ACCESS SECURITY AND KEYLESS ENTRY SYSTEM

(75) Inventors: Dave S. Magner, Decorah, IA (US); Anita L. Reichling, New Hampton, IA (US); David C. Smart, Waterloo, IA (US); Robert D. Lawson, Johnston, IA (US)

(73) Assignee: Trimark Corporation, New Hampton, IA (US)

( * ) Notice: Subject to any disclaimer, the term of this patent is extended or adjusted under 35 U.S.C. 154(b) by 1778 days.

(21) Appl. No.: 11/532,581

(22) Filed: Sep. 18, 2006

(65) Prior Publication Data

US 2010/0321173 A1 Dec. 23, 2010

Related U.S. Application Data

(63) Continuation-in-part of application No. 10/212,852, filed on Aug. 6, 2002, now Pat. No. 7,119,709.

(51) Int. Cl.
*B60R 25/00* (2006.01)
*G05B 19/00* (2006.01)
*H04B 1/00* (2006.01)

(52) U.S. Cl. ........................ 340/5.72; 340/5.2; 340/5.71

(58) Field of Classification Search ................. 340/5.72, 340/539, 5.2, 426, 5.71, 825.69; 455/411; 701/2, 211, 29, 36
See application file for complete search history.

(56) References Cited

U.S. PATENT DOCUMENTS

| | | | |
|---|---|---|---|
| 4,205,325 | A | 5/1980 | Haygood |
| 4,206,491 | A | 6/1980 | Ligman |
| 4,488,056 | A | 12/1984 | Mochida |
| 4,688,036 | A | 8/1987 | Hirano |
| 4,742,327 | A | 5/1988 | Burgess |
| 4,942,393 | A | 7/1990 | Waraska |
| 5,109,221 | A | 4/1992 | Lambropoulos |
| 5,113,182 | A | 5/1992 | Suman |
| 5,148,348 | A | 9/1992 | White |
| 5,252,960 | A | 10/1993 | Duhame |
| 5,278,547 | A | 1/1994 | Suman |
| 5,402,322 | A | 3/1995 | Kunkler |
| 5,442,341 | A | 8/1995 | Lambropoulos |
| 5,467,080 | A | 11/1995 | Stoll |
| 5,499,022 | A | 3/1996 | Boschini |
| 5,650,774 | A | 7/1997 | Drori |
| 5,669,522 | A | 9/1997 | Million |

(Continued)

FOREIGN PATENT DOCUMENTS

| | | |
|---|---|---|
| EP | 1158718 A2 | 11/2001 |

*Primary Examiner* — Nam V Nguyen

(74) *Attorney, Agent, or Firm* — McKee, Voorhees & Sease, P.L.C.

(57) ABSTRACT

A system for providing secured access to and/or control of a vehicle is provided. The system includes a vehicle network such as a CAN. A remote communications device is used for sending a signal for controlling functions associated with the vehicle. There is a receiver operatively connected to the vehicle network and adapted to receive the signal from the remote communications device. At least one access module is adapted to provide control of functions of the vehicle by a user from outside of the vehicle, the access module is electrically connected to the vehicle network. There is at least one user input device associated with the access module and there are a plurality of outputs associated with the access module wherein the access module is adapted to directly control access to the vehicle through control of the plurality of outputs.

31 Claims, 7 Drawing Sheets

U.S. PATENT DOCUMENTS 5,719,551 A * 2/1998 Flick ........................ 340/426.25
5,767,588 A 6/1998 Nakaya
5,783,994 A 7/1998 Koopman
5,907,195 A 5/1999 Issa
5,973,611 A 10/1999 Kulha
6,031,465 A 2/2000 Burgess
6,084,317 A 7/2000 Wolfe
6,100,811 A 8/2000 Hsu
6,169,379 B1 1/2001 Zhang
6,271,745 B1 8/2001 Anzai
6,392,534 B1 * 5/2002 Flick ........................ 340/426.17
6,577,928 B2 6/2003 Obradovich
6,606,492 B1 8/2003 Losey
6,812,829 B1 * 11/2004 Flick ........................ 340/426.13
6,982,626 B2 * 1/2006 Nedorezov ................... 340/5.71
7,106,171 B1 9/2006 Burgess
7,243,007 B2 * 7/2007 Wilson et al. ..................... 701/2
2004/0027237 A1 2/2004 Magner

* cited by examiner

ELECTRONIC ACCESS SECURITY AND KEYLESS ENTRY SYSTEM

PRIORITY STATEMENT

This application is a Continuation-in-part of, and claims priority to, U.S. patent application Ser. No. 10/212,852 filed Aug. 6, 2002, now U.S. Pat. No. 7,119,709 issued on Oct. 10, 2006, herein incorporated by reference in its entirety.

BACKGROUND OF THE INVENTION

This invention relates to secured access to vehicles. More specifically, this invention relates to a system for providing secured access to a vehicle using both a remote communications device such as a transmitter and an access module such as a vehicle-mounted keypad, especially when used with a vehicle network such as a Controller Area Network (CAN).

Keyless entry systems are widely used in cars and trucks. Typically, keyless entry systems include a key chain fob with several push buttons that lock and unlock doors, release a trunk latch, or activate a horn and/or lights associated with a panic function. The sophistication of such systems varies and other functions may be provided. This type of keyless entry is generally considered to be convenient and to promote safety.

Another type of electronic access system uses a door-mounted keyless entry system. In such a system, a keypad provides for access to a vehicle. A user typically provides an access code in order to gain entry into the vehicle.

Both the remote transmitter and the keypad entry system have their respective advantages. With the remote transmitter system, doors can be unlocked prior to an individual reaching the vehicle. In addition, the individual must have the remote transmitter or a key in order to gain access into the vehicle.

With the keypad, the user has the convenience that they need not carry the transmitter with them in order to access the vehicle. Where a keypad is used, they need only remember the proper combination.

Some attempts have been made in providing vehicles having both a transmitter and a keypad. One such example is U.S. Pat. No. 6,031,465. In addition, Ford offers certain of its vehicles with both a transmitter and a keypad.

Despite these prior art attempts, problems remain. In particular, current keyless access systems are limited in the functions, scale, and scope they provide. While some vehicles such as passenger cars may only require a few different functions others require increased functionality.

A further problem is that systems can consist of different components (including keypads, RF systems, and security systems) that are not compatible unless additional external components (including, but not limited to diodes, external relays, resistors) are used within the vehicle's wiring harness. This results in a complex and costly systems that provides for little opportunity for customization.

These problems are particularly apparent as they relate to non-automotive vehicles. Many vehicles are far more complicated than cars. For example, recreational vehicles (RVs), trucks, specialty vehicles, emergency vehicles, construction equipment, agricultural equipment and other types of vehicles may be large in nature and have numerous features or amenities that it would be useful and desirable to control without the operator being physically located in the driver's seat. These types of vehicles may have multiple entry doors, multiple compartments on the inside or outside of the vehicles, gas compartment doors, maintenance doors, various lighting fixtures on the inside or outside of the vehicle, and numerous other functions some of which may be highly specialized. These vehicles are more likely to need greater customization. Therefore reworking the wiring harness for each specific application is impractical and cost prohibitive.

Therefore, it is a primary object, feature, or advantage of the present invention to improve upon the state of the art.

Another object, feature or advantage of the present invention is to provide a keyless access system for a vehicle that can use both a remote and an access module such as a keypad physically attached to the vehicle.

Yet another object, feature, or advantage of the present invention is to provide a keyless access system for a vehicle that can be used to both sense or monitor states associated with the vehicle as well as to control functions of the vehicle.

A still further object, feature, or advantage of the present invention is to provide a keyless access system for a vehicle that has numerous functions, features or amenities for which keyless access is desired.

Another object, feature, or advantage of the present invention is to provide an integrated access system that is customizable, including with respect to outputs related to vehicle functions and inputs related to vehicle states without requiring redesign of the vehicle's wiring harness.

Yet another object, feature, or advantage of the present invention is the provision of an integrated access system that provides flexibility in the number and types of control outputs, and flexibility in the number and types of monitoring inputs.

A further object, feature, or advantage of the present invention is to provide a vehicle system with modules which are configurable or re-configurable so that a single design of a module may be used for different purposes depending upon preferences of an end user or expectations of a particular model or type of vehicle.

A further object, feature, or advantage of the present invention is to provide a vehicle access system that is expandable.

A further object, feature, or advantage of the present invention is to provide an access system that can use a network such as a CAN so that OEM and third party devices may communicate in a manner that provides for additional vehicle functionality.

A still further object, feature, or advantage of the present invention is to provide a system that allows for CAN control via a keypad.

Another object, feature, or advantage of the present invention is to provide for secured functions inside of a vehicle, such as keyless ignition or extra security compartments.

Yet another object, feature, or advantage of the present invention is to provide a system that receives wireless RF signals which can be transmitted via a CAN network.

A further object, feature, or advantage of the present invention is provide for diagnostics and error reporting over a CAN network.

Another object, feature, or advantage of the present invention is to provide a system for vehicle access which is convenient to install and connect to the rest of the vehicle.

Yet another object, feature, or advantage of the present invention is to provide a system for vehicle access which incorporates multiple user interfaces.

A still further object, feature, or advantage of the present invention is a system that provides for additional distributed control.

Another object, feature, or advantage of the present invention is a system that allows keypads, an RF system, door modules, and full function IO modules connectivity to other electrical components.

One or more of these and/or other objects, features, or advantages of the present invention will become apparent from the specification and claims that follow.

SUMMARY OF THE INVENTION

The present invention is a system for providing secured access to a vehicle without requiring keys or requiring that the operator be inside of the vehicle. The present provides for both sensing inputs or states associated with the vehicle as well as controlling functions or outputs of the vehicle. The system is flexible and allows for customization without requiring reworking of the vehicle's wiring harness.

According to one aspect of the present invention, a system for providing secured access to a vehicle includes a remote communications device for sending a signal for controlling a first set of functions associated with the vehicle, a receiver associated with the vehicle and adapted to receive the signal, an access module operatively connected to the vehicle and adapted to provide control of the second set of functions of the vehicle by a user from outside of the vehicle, the first set of functions may be similar to or completely different from the second set of functions, a plurality of actuators disposed within the vehicle and wherein at least a portion of the first set of functions or at least a portion of the second set of functions are associated with at least one of a plurality of actuators, and a controller module electrically connected to the receiver, the access module, and the plurality of actuators. The access module can be a vehicle-mountable keypad accessible from outside of the vehicle. The system can include more than one access module. In addition, the system can include a plurality of sensors and/or switches associated with the vehicle and electrically connected to the controller module.

According to another aspect of the present invention a system for providing secured access to a vehicle is provided. The system includes a remote communications device for sending a signal for controlling a first set of vehicle functions associated with the vehicle, a receiver associated with the vehicle and adapted to receive the signal, a first access module operatively connected to the vehicle and adapted to provide control of a second set of vehicle functions of the vehicle by a user from outside of the vehicle, a plurality of zones associated with the vehicle, each of the zones having at least one electrically controlled switch, a first controller module electrically connected to the receiver, the first access module, and the at least one electronically controlled switch, the first set of vehicle functions associated with at least one of the plurality of zones, the second set of vehicle functions associated with at least one of the plurality of zones, and the first set of vehicle functions being different from the second set of vehicle functions.

According to another aspect of the present invention a system for providing secured access to a vehicle includes a vehicle network and a remote communications device for sending a signal for controlling functions associated with the vehicle. There is a receiver operatively connected to the vehicle network and adapted to receive the signal from the remote communications device. There is also an access module adapted to provide control of functions of the vehicle by a user from outside of the vehicle, the access module electrically connected to the vehicle network. There is also a user input device associated with the access module and a plurality of outputs associated with the access module wherein the access module is adapted to directly control access to the vehicle through control of the plurality of outputs. The access module may be adapted to control access to the vehicle using the plurality of outputs based on a message received over the vehicle network. The access module may be adapted to send a message over the vehicle network to control functions of the vehicle based on input received from the user input device. The vehicle network may be a CAN type network.

According to another aspect of the present invention a system for providing secured access to a vehicle is provided. The system includes a vehicle network and a remote communications device for sending a signal for controlling functions associated with the vehicle. There is a receiver operatively connected to the vehicle network and adapted to receive the signal from the remote communications device and an access module adapted to provide control of functions of the vehicle by a user from outside of the vehicle, the access module electrically connected to the vehicle network. There is also a user input device associated with the access module as well as a plurality of outputs associated with the access module wherein the access module is adapted to directly control access to the vehicle through control of the plurality of outputs. The access module is adapted to control access to the vehicle using the plurality of outputs based on a message received over the vehicle network. The access module is adapted to send a message over the vehicle network to control functions of the vehicle based on input received from the user input device.

According to another aspect of the present invention a system for providing customization is to include configurability and expandability. Customization is achieved by changing functionality of modules by modifying the module's configuration. Customization can also be achieved by expanding the scope of the system. Through expansion, additional modules with added functions allow the system to better suit a particular application.

According to another aspect of the present invention a system for providing secured access to a vehicle includes a remote communications device for sending a signal for controlling a first set of functions associated with the vehicle and a receiver associated with the vehicle and adapted to receive the signal. There is an access module operatively connected to the vehicle and adapted to provide access to control of a second set of functions of the vehicle by a user. There are also a plurality of actuators disposed within the vehicle. At least a portion of the first set of functions and at least a portion of the second set of functions are associated with at least one of the plurality of actuators. There is a controller module electrically connected to the receiver, the access module, and the plurality of actuators. The second set of functions is configurable using commands for changing programming According to another aspect of the present invention a configurable system for providing access to a vehicle includes a vehicle network and a remote communications device for sending a signal for controlling a first set of vehicle functions. There is a receiver associated with the vehicle and adapted to receive the signal, the receiver operatively connected to the vehicle network. There is an access module operatively connected to the vehicle network and adapted to provide control of a second set of vehicle functions by a user from outside of the vehicle. The access module includes a plurality of outputs electrically connected to a plurality of electronic devices associated with the vehicle and at least a portion of the first set of functions or at least a portion of the second set of functions are associated with at least one of the plurality of electronic devices. The access module includes a plurality of inputs electrically connected to sensors for monitoring vehicle state.

According to another aspect of the invention an expandable and configurable system for providing secured access to and control of a vehicle is provided. The system includes a vehicle network. There are a plurality of access modules, each of the access modules electrically connected to the vehicle network. Each of the plurality of access modules includes an input device for receiving input from a user, at least one input from a sensor of the vehicle, and at least one output to control an electronic device associated with the vehicle. Each of the plurality of access modules is adapted to send and receive messages over the vehicle network.

According to another aspect of the invention a method for installing and configuring a control system associated with a vehicle is provided. The method includes configuring software of access module for the vehicle, placing within the vehicle an access module having a user input device to allow a user to gain access to vehicle, electrically connecting inputs of the access module to one or more sensors, electrically connecting outputs of the access module to one or more electronic devices, and electrically connecting the access module to a vehicle network. The access module may be of various types and may be a keypad module which includes a keypad. The vehicle network may be of various types, including a control area network.

According to another aspect of the present invention, an expandable and configurable system for providing secured access to and control of a vehicle is provided. The system includes a plurality of vehicle-mountable keypad modules. There is at least one controller module electrically connected to the plurality of vehicle mountable keypad modules and adapted to connect with additional controller modules or keypad modules to thereby provide expandability. Each of the plurality of vehicle mountable keypad modules is adapted to receive a user-entered security code to provide access to a set of functions and then to receive at least one separately entered code for selecting at least one of the set of functions to control after access is provided.

DETAILED DESCRIPTION OF THE INVENTION

The present invention provides for a keyless access system for a vehicle. Although the term "keyless entry" system is more commonly used, the term "keyless access" system is used herein because the present invention provides for vehicle functions beyond merely entry into the vehicle.

Figure 1:
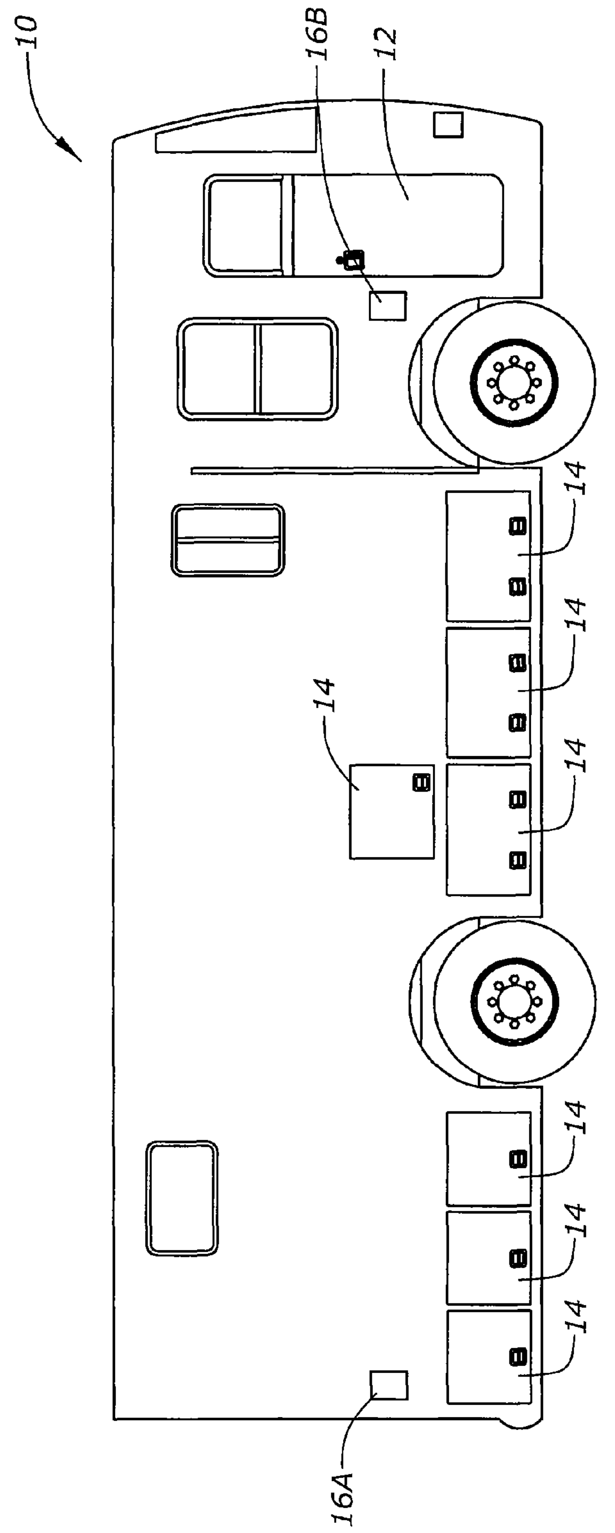
FIG. 1 is a side view of a vehicle equipped with a secured access system according to one embodiment of the present invention.

FIG. 1 illustrates a vehicle 10 according to one embodiment of the present invention. The vehicle 10 shown is an RV, however, the present invention is in no way limited for use in an RV. The present invention can be used in numerous applications, including vehicles such as semi-truck tractors, ambulances, construction equipment, and other types of vehicles. The vehicle 10 shown has a passenger door 12 and a number of different compartment doors 14. The compartment doors

14 are spread out along the passenger side of the vehicle 10. Two different access modules 16 are also shown. The access modules 16A and 16B can be keypads. Access modules 16A and 16B are located on different ends of the vehicle 10 with access module 16B being located proximate the passenger door 12 and access module 16A being located proximate the rear most compartment doors 14. Although only two access modules 16A and 16B are shown, the present invention contemplates that numerous access modules can be provided. The access modules 16A and 16B can be keypads that require a security code prior to being used to control vehicle functions. Alternatively, the present invention contemplates that the access modules can otherwise provide for secured access. For example, biometric systems, including, but not limited to finger print access systems or retinal scanning systems can be used. Further, various transponder or transceiver systems could also be used.

Either access module 16A and/or 16B can be used to control vehicle functions. This allows an operator to fully control vehicle functions from either location. For example, an operator of the vehicle 10 can use access module 16B to unlock the passenger door 12 and enter the vehicle 10. The operator can also use the access module 16A to open various compartment doors 14, including the rear most doors 14. The present invention also provides for any number of sensors or switches to be placed throughout vehicle 10. These sensors or switches can include, without limitation, door ajar switches, interior lock/unlock (momentary rocker) manual switches, and other types of switches.

Figure 2:
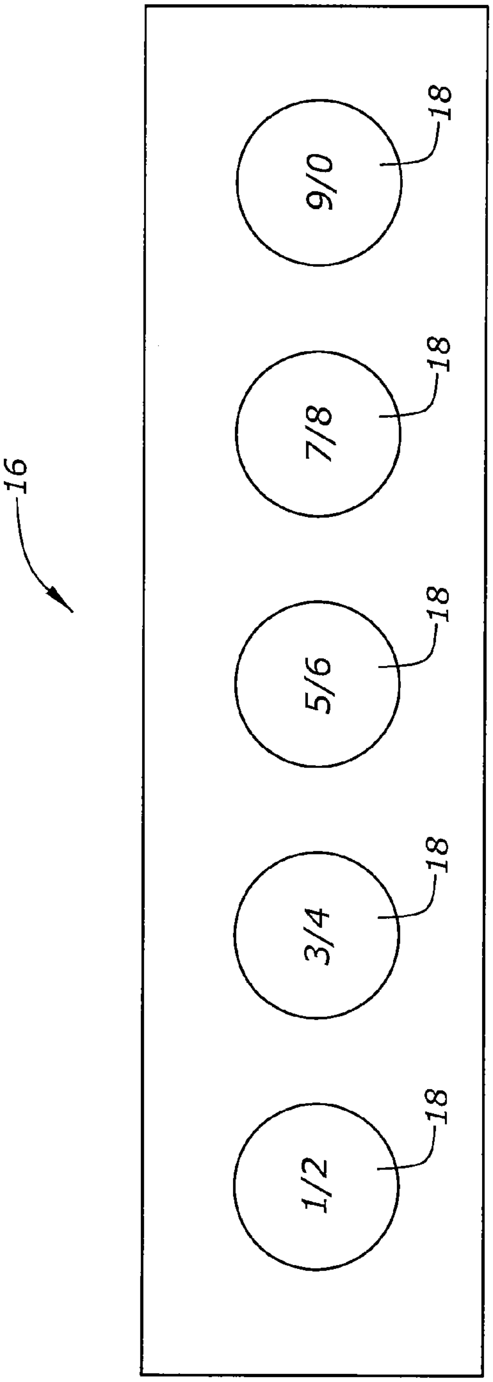
FIG. 2 is a front view of one access module according to one embodiment of the present invention.

FIG. 2 provides one embodiment of an access module 16 of the present invention. In the access module 16, a plurality of buttons 18 are shown. The operator can enter an access code into the access module 16 prior to specifying particular vehicle functions. To facilitate the entry of a code, each of the buttons 18 can be labeled such as with one or more numbers as shown. The access module 16 may be mounted vertically or horizontally onto the vehicle 10. Preferably, the buttons 18 provide both visual feedback through back lighting or other means as well as tactile feedback and audible feedback so that an operator can be certain as to which buttons 18 have been pressed.

Figure 3:
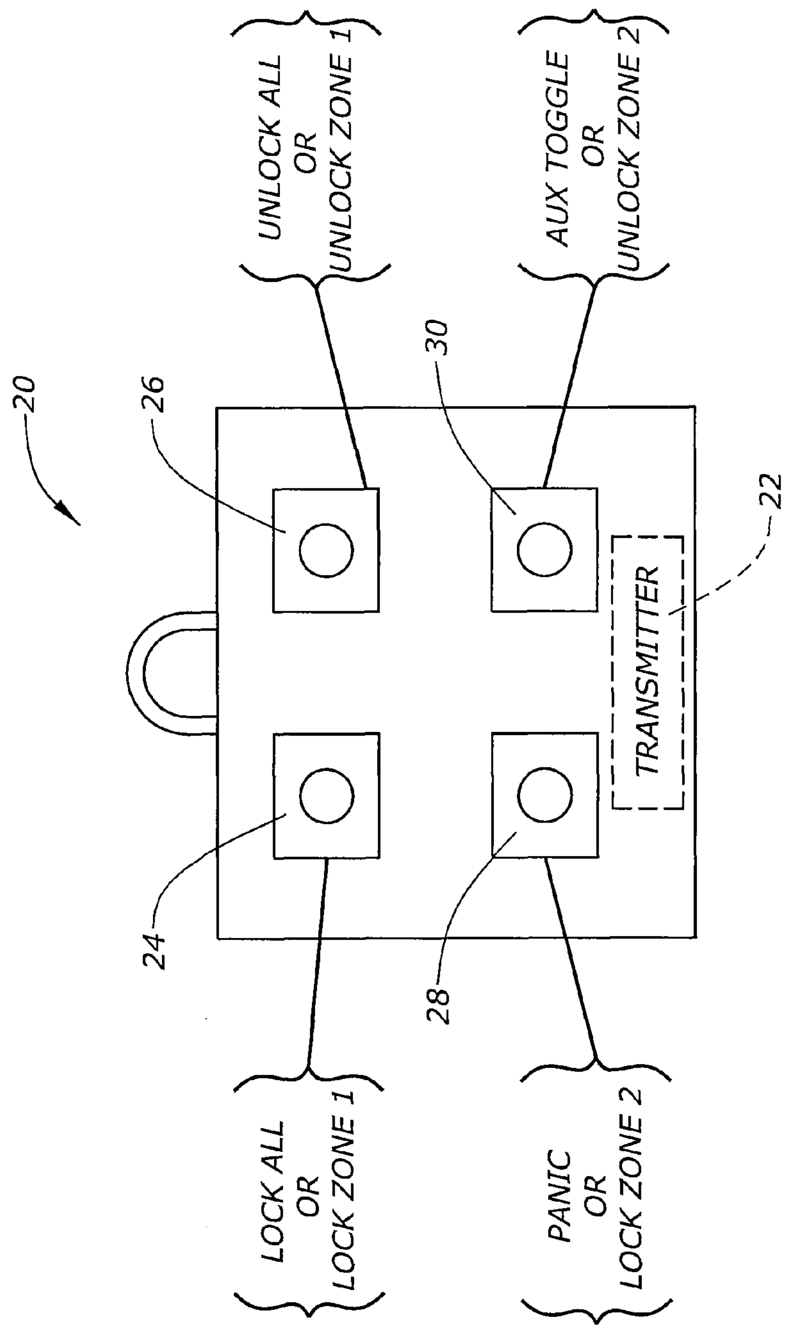
FIG. 3 is a front view of a key fob transmitter according to one embodiment of the present invention.
Figure 4:
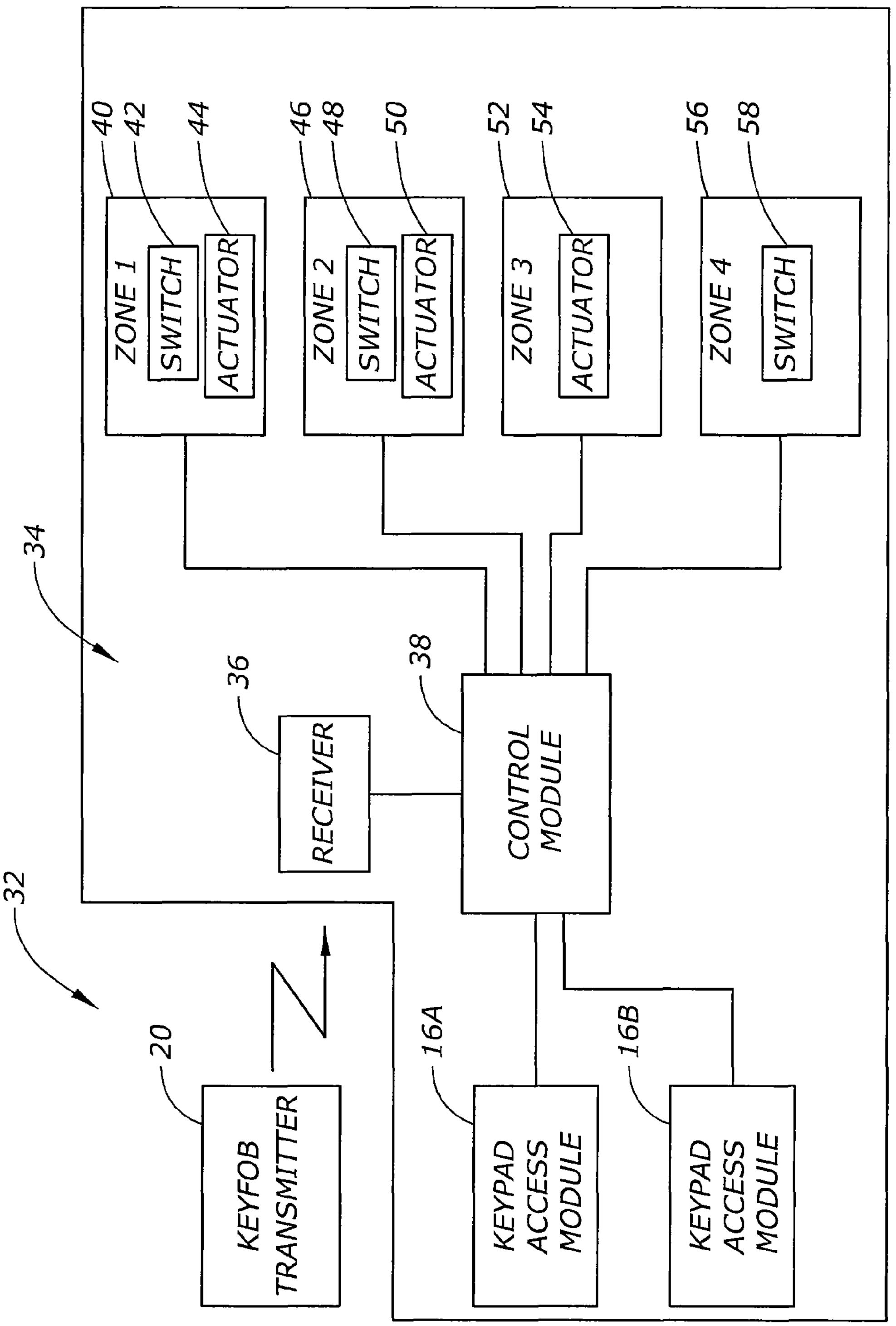
FIG. 4 is a block diagram of a keyless access system according to one embodiment of the present invention.

FIG. 3 provides a front view of a key fob transmitter 20 according to one embodiment of the present invention. The key fob transmitter 20 is available from various sources. The key fob transmitter 20 includes buttons 24, 26, 28, and 30. The buttons 24, 26, 28, and 30 are associated with different vehicle functions. For example, button 24 can be associated with a function to lock all doors or to lock only those locks associated within a particular zone of the vehicle. Similarly, the button 26 can be used to unlock all the doors or unlock locks associated with a zone of a vehicle. The button 28 can be used to provide an auxiliary function as long as the button is pressed, or to toggle an auxiliary function or to lock a second zone of the vehicle. The button 30 can be used as panic button, such as to activate the vehicle horn or lights or to unlock a second zone of the vehicle. In addition, a transmitter 22 is a part of the key fob 20 device. Although a key fob transmitter is shown, the present invention contemplates that other types of transmitters or transponders can be used in a remote system. Preferably, the remote transmitter is a code-hopping, rolling code, or code swapping transmitter in order to improve the security of the system. A transmitter is merely one type of remote communications device that can be used. The present invention also contemplates that a transponder, proximity device, or other remote communications device can be used FIG. 4 provides a block diagram according to one embodiment of the present invention. An electronic access system 32 is shown. The system 32 includes a key fob transmitter unit 20 and a vehicle subsystem 34. The vehicle subsystem 34 includes a receiver 36 in communication with the key fob transmitter 20. The key fob transmitter 20 communicates with the receiver 36 through RF communications or otherwise. The receiver 36 is electrically connected to a controller module 38. A controller module 38 is also connected to one or more access modules 16A and 16B. The access modules may be keypad access modules, however, the present invention contemplates that instead of using buttons for entering a security code and controlling functions, other types of access may be provided. Instead of using a keypad as a user input device, a biometric reader may be used, an RFID reader or interrogator may be used, or other types of user input devices may be used alone or in combination with a keypad or other type of user input device. In addition to these inputs, the controller module 38 includes a number of outputs. The controller module 38 is used to control a plurality of zones. A zone is a grouping of acuators or other electronic switches associated with a vehicle and vehicle functions. For example, various switches can be used to control lighting, various actuators can be used to control locking and unlocking compartment doors or entry doors, opening doors, or other vehicle functions. For illustrative purposes, a first zone 40 is shown containing both a switch 42 and an actuator 44. A second zone 46 is shown containing both a switch 48 and an actuator 50. A third zone 52 is shown containing an actuator 54 and a fourth zone 56 is shown containing a switch 58. The present invention contemplates numerous zones and within each zone the present invention contemplates that any number of electronic switches and/or actuators may be used.

Figure 5:
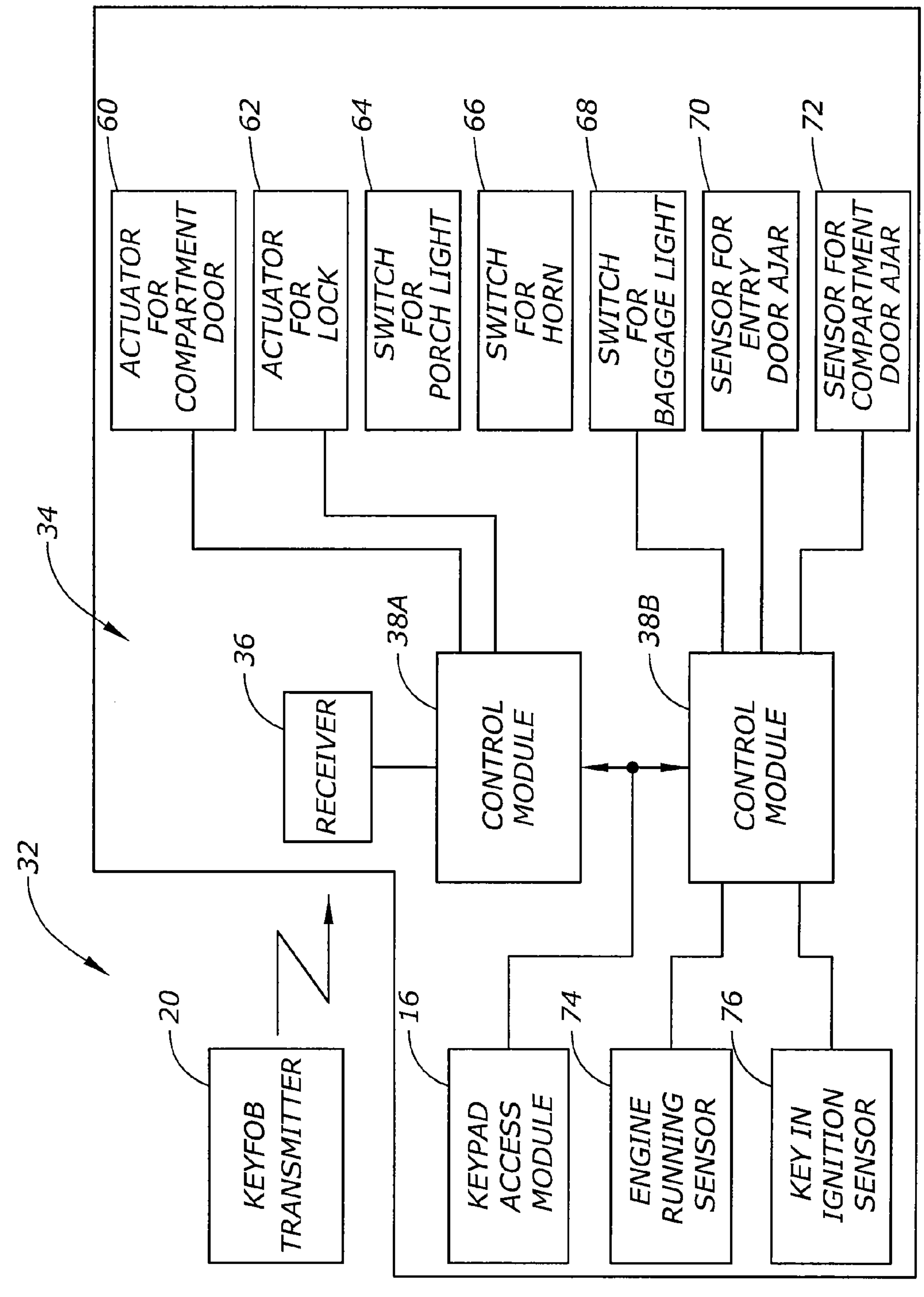
FIG. 5 is a block diagram of a keyless access system according to another embodiment of the present invention.

FIG. 5 provides another embodiment of the present invention. In FIG. 5, multiple controller modules are shown. A first controller module 38A and a second controller module 38B are shown. The present invention contemplates that numerous controller modules 38 can be used. Where more than one controller module 38 is used, the controller modules 38 can communicate through network communication. By daisy chaining the controller modules 38, additional inputs and outputs to the access system can be provided.

It should be understood that as shown in FIG. 5 and elsewhere, the present invention provides for communication between controller modules 38. In one embodiment, each controller module can send multiplexed messages to and from other controller modules. This allows a system of the present invention to provide for expansion in that additional inputs and/or outputs can be used. The present invention provides for network communication between controller modules. Many protocols and/or message formats may be used. According to one embodiment a physical layer based on the J1708 standard is used. The messages sent begin with an 'STX' (02H) character and end with an 'ETX' character. These are transmitted at 2400 baud with 8 data bits and 1 stop bit. Various commands can then be used as may be appropriate in a particular environment or application. The commands can include commands to learn and/or change programming, commands that will change security codes, commands that will lock all doors, commands to unlock a particular zone, commands to unlock all zones, commands to toggle an auxiliary output, commands to provide an auxiliary output as long as the button is pressed or for a defined length of time, commands to send a pulse output, commands to change the status (for example to change between a secure mode and an unsecure mode), commands to indicate errors, and commands to issue a wakeup to particular devices.

The present invention further allows for particular vehicle outputs to be enabled or disabled. For example, in specialized vehicles, there is various equipment associated with the vehicle. Such equipment can include motor or hydraulic controlled equipment such as winches, booms, and other equipment. The present invention allows for messages to be used to enable or disable particular equipment. This can be for safety reasons, or other appropriate reasons.

The present invention further provides for multiple user codes to be used. Each user code can be associated with different sets of vehicle functions. This allows different users to have access to different vehicle functions. Each user code can have more access, less access, or different access to vehicle functions than other user codes. For example, where the vehicle is an ambulance and has a compartment containing pharmaceuticals, a person who is only a driver for the vehicle would not need access to the compartment and therefore would not be able to unlock the compartment door using their user code. In another example, a particular vehicle compartment can be designated to be accessible only by service personnel with an appropriate code. The present invention contemplates any number of examples involving any number of different vehicles, especially specialized vehicles, and any number of types of users where there is reason to provide different users with different types of access to vehicle functions. In this manner, the present invention further provides for additional customization of features by providing flexibility based on the vehicle functions of the specific vehicle and the types of users who will have access to the vehicle functions.

The present invention also provides for low power consumption. The control module 38 includes power management features to reduce power consumption. The present invention contemplates that a vehicle of the present invention can be seasonal and therefore may have long periods (i.e. months) without use. Thus, low power consumption is particularly important. In addition, the access module includes power management. The power management features of the present invention allow for power consumption to be reduced when the system is idle.

As shown in FIG. 5, the present invention provides for inputs such as sensors or switches to be used in addition to outputs. The first controller module 38A in FIG. 5 is electrically connected to an actuator 60 associated with a compartment door, an actuator 62 associated with an entry door lock, a switch for a porch light 64, a switch for the horn 66. The second controller module 38B is electrically connected to a switch or a baggage light 68, a sensor for an entry door ajar 70, a sensor for a compartment door ajar 72, an engine running sensor 74, and a key in ignition sensor 76.

Thus each controller module 38 can be used in conjunction with both inputs and outputs. The present invention contemplates that the controller module 38 can also communicate with other aspects of the vehicle. The present invention can easily be expanded through the addition of access modules and/or controller modules. The structure of the present invention allows it to easily accommodate the wiring harness of a specialized vehicle so that the system can be placed in a vehicle without requiring redesign of the vehicle's wiring harness. The system of the present invention therefore provides a convenient, flexible, and customizable means for providing secured access to a vehicle, for controlling vehicle functions, and monitoring vehicle states.

Figure 6:
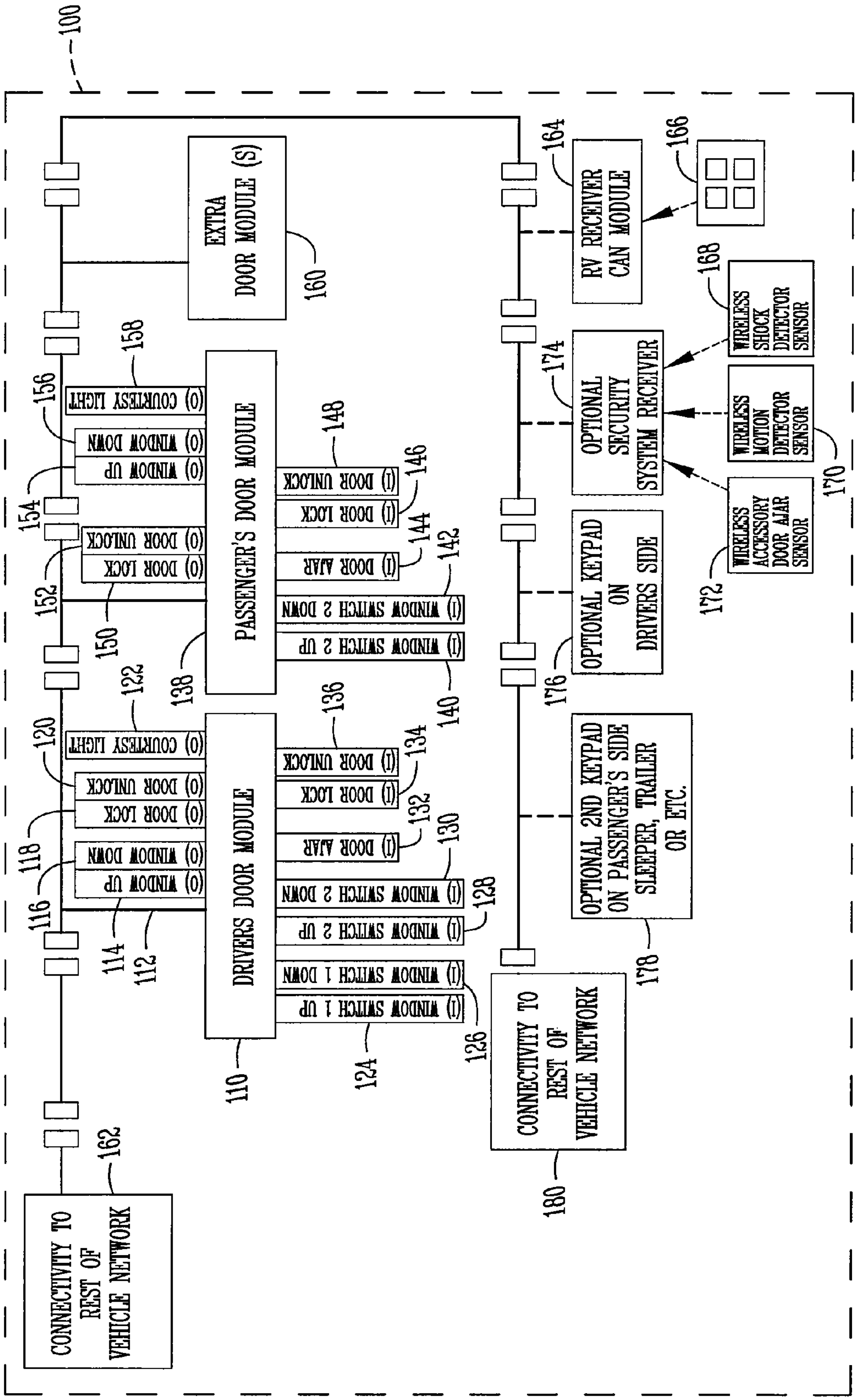
FIG. 6 is a block diagram of a vehicle system according to another embodiment of the present invention.

FIG. 6 illustrates one embodiment of a system of the present invention. It should be understood that as shown in FIG. 6 and elsewhere, the present invention provides for communication between different modules via a CAN network. CAN networks are governed by industry wide standards, such as Society of Automotive Engineers (SAE), Recreational Vehicle Industry Association (RVIA), International Standards Organization (ISO), etc. In one embodiment, each module can send multiplexed messages to and from other modules according to the chosen standard of the system. Various multiplexing protocol standards may be used in any embodiment.

The system 100 is shown. A driver's door module 110 is shown. The inputs for the driver's door module 110 include a first window up input switch 124, a first window down input switch 126, a second window up input switch 128, a second window down input switch 130, a door ajar input 132, a door lock input 134, a door unlock input 136. The outputs for the driver's door module 110 include a window up output 114, a window down output 116, a door lock output 118, a door unlock output 120, and a courtesy light output 122. A stub 112 shown is used to connect the driver's door module 110 to the CAN. Preferably, the length of the stub 112 is less than about one meter.

A passenger door module 138 is also shown. The passenger door module 138 includes inputs for the second window up switch 140, the second window down switch 142, a door ajar input 144, the door lock input 146, a door unlock input 148. The outputs for the passenger door module 138 include a door lock output 150, a door unlock output 152, a window up output 154, a window down output 156, and a courtesy light output 158.

One or more additional door modules, such as extra door module 160 may be used to further provide for expanded functionality. An RF receiver CAN module 164 is shown which is in operative communication with an RF transmitter 166.

An optional security system receiver 174 is shown. The security system receiver 174 is operatively connected to a wireless shock detector sensor 168, a wireless motion detector sensor 170, and a wireless accessory door ajar sensor 172. An optional keypad 176 on the driver's side is shown as well as an optional second keypad 178 such as on a passenger's side, on a sleeper, trailer, or elsewhere.

Blocks 162, 180 provide for connectivity to the rest of the vehicle network. The present invention contemplates that numerous types of vehicle controls may use the CAN 163. This may include original equipment of the vehicle as well as aftermarket devices.

Figure 7:
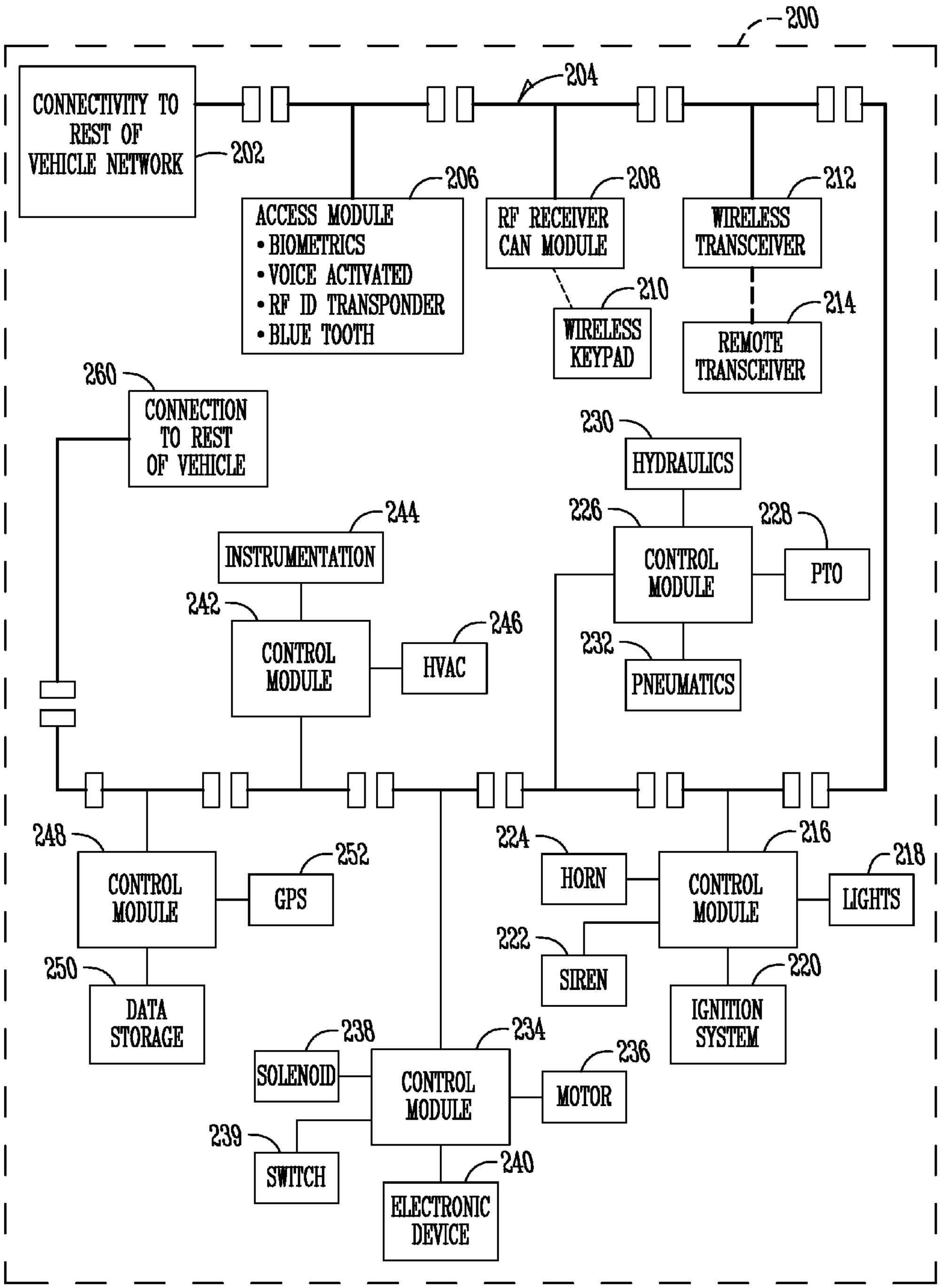
FIG. 7 is a block diagram of a vehicle system according to another embodiment of the present invention.

FIG. 7 provides another embodiment of a system 200. FIG. 7 illustrates one embodiment of a system of the present invention. It should be understood that as shown in FIG. 7 and elsewhere, the present invention provides for communication between different control modules via a CAN network. CAN networks are governed by industry wide standards, such as Society of Automotive Engineers (SAE), Recreational Vehicle Industry Association (RVIA), International Standards Organization (ISO), etc. In one embodiment, each controller module can send multiplexed messages to and from other controller modules according to the chosen standard of the system Various multiplexing protocol standards may be used in any embodiment.

Block 202 includes connectivity to the rest of the vehicle network. A CAN network 204 is shown. There is an access module 206 electrically connected to the CAN network 204. The access module 206 may include a biometric reader, a voice activation circuit, an RFID transponder or other type of transponder, or a BLUETOOTH, Wi-Fi, or other type of transceiver. An RF receiver CAN module 208 is electrically connected to the CAN network 204. A wireless keypad 210 is in operative communication with the RF receiver CAN module 208. Thus, a remote device such as a wireless keypad 210 can be used to connect with a CAN network 204. A wireless transceiver 212 is also electrically connected to the CAN network 204. Any number of different types of wireless communications may be used including satellite, cellular, or other types of wireless communications. A remote transceiver 214 is shown which is in operative communication with the wireless transceiver 212. The remote transceiver 214 may be associated with ONSTAR or another type of navigation system, may be a device capable of cellular communications, or may be another type of device.

A number of control modules 216, 226, 234, 242, 248 are also shown. Each of the control modules may be used to provide for I/O including one or more inputs and/or one or more outputs. Control modules may be placed within a vehicle at locations near the inputs and outputs associated with the control module. Note that each of the control modules is attached to the CAN network 204 so that each of the control modules can send or receive messages over the CAN network such as to send or receive a command to perform a vehicle function or to request the status of a vehicle feature or function.

Control module 216 is operatively connected to lights 218, an ignition system 220, a horn 224, and a siren 222. The ignition system 220 may provide for remote start or keyless ignition such as by receiving appropriate instructions from the access module 206.

Control module 226 is electrically connected to a power takeoff 228, a hydraulic system 230, and a pneumatic system 232. Thus inputs and outputs associated with these systems may be monitored or controlled through use of the CAN network 204.

Control module 234 is electrically connected to a motor 236, a solenoid 238, a switch 239, and another electronic device 240. Any number and types of electronic devices may be connected to the control module and these devices may be used to perform any number of vehicle functions.

Control module 242 is electrically connected to an HVAC system 246 and instrumentation 244. Any number of types of instrumentation may be connected to the control module 242 and any number of HVAC components may be connected to the control module 242.

Control module 248 is electrically connected to a geolocation system such as a GPS 252. In addition, the control module 248 is electrically connected to data storage 250. Thus, the system can also be used to provide an audit trail for the vehicle including what functions were activated when information regarding those functions is sent over the CAN network 204. The information stored in the data storage 250 can also include time stamped location information from the GPS 252. This information can be used to track vehicle usage including usage by each individual where there is security code information, voice footprint information or other voice identification related information, or biometric information being used to uniquely identify each user of the vehicle. Block 260 connects the shown portion of the CAN network 204 to the rest of the vehicle.

It should be apparent that the present invention allows for customization. Customization may include both being configurable or re-configurable as well as being expandable. In this context, configurable means that a module's functionality may change. In this context, expandable means that multiple combinations of different modules can provide for change in system scope and functionality. Customization enables a system to serve multiple customers and markets. Markets can include various types of on road and off road vehicles as well as stationary applications for resident or commercial businesses or other industrial enclosures.

It should also be apparent that the system is configurable in that each module's functionality can change. The keypad or other access modules have the ability to activate and deactivate different software so that functions can be enabled or disabled or changed to suit a particular application. Different functions may suit the preferences of the end user or expectations associated with a particular model of vehicle or type of vehicle.

As an example, access module configuration changes may result in different functionality for a single printed circuit board hardware design. The different configurations may include a basic on-road security system mode, a keyless ignition mode, an off-road system mode, and an ambulance mode. In the basic on-road security system mode, the keypad provides a locking event and arms the security system if a first button is pressed and held for at least 2 seconds. The keypad would unlock and disarm the security system if the access code is entered. In the keyless ignition mode, the keypad would send an ignition start message after a correct code is entered. In the off-road system mode the keypad would provide lock and unlock messages as in the basic on-road security mode, however, there would also be a special procedure to open an engine compartment and control a hydraulic system of a tractor or construction equipment. In the ambulance mode, the keypad would control multiple doors so that extra security could be assigned. For example, a special code may be needed to access the compartment containing pharmaceutical products.

To change product configurations one procedure that may be used is to place all CAN keypads into a configuration mode. In this configuration mode, one could enable/disable different software of the keypad or other modules of the CAN network. Thus one should appreciate that access modules such as keypads that are configured differently could be used on different vehicles or differently configured access modules could be installed in a single vehicle.

It should also be appreciated that keypads are merely one example of an access module. It should further be appreciated that other types of modules are configurable as well. This includes the control module, a door module, biometric access module, an RFID transponder reader module, a Bluetooth reader module, an RF receiver module, or other types of modules.

The ability of the system to add modules increases the scope and/or function of the system. This is particularly useful in various contexts, including being useful to OEMs that offer keypads or other types of access modules as optional equipment. In these cases, having access modules such as keypad modules that complement one another and other modules in an expandable network is important.

For example, a particular recreational vehicle may want to offer their customer options to customize their vehicle regardless of the class of the RV. Expandability would allow customer customization of RVs ranging from inexpensive towable RVs to Class A bus-type RVs and every type of RV in between. The choice of which access module and how many access modules would define which functions and how many of each function would exist such that a customer could customize these securing and convenience items through adding multiple keypad modules or other types of access modules.

The CAN approach allows for simple expansion. That is to say that modules can be added without much effort from an OEM or installer. The CAN wiring scheme allows modules to be added without complex wiring harness design as modules are networked in parallel per SAE J1939 standard or other appropriate standards.

It should also be appreciated that the system of the present invention provides for both CAN communications and discrete input and outputs. In this way a single hardware design can satisfy two different functional sets of expectations. By designing both sets into a single product it stream-lines design and validation efforts, consolidates manufacturing efforts and results in increased volumes of PCB production. This may result in lower development and manufacturing costs, simplified logistics, and ease of long term product management.

The CAN messaging provides for communication to a vehicle network where one is present. This allows for shared information of OEM devices and other third party equipment to customize vehicle functionality. Where a keypad is used as an access module, the keypad can provide a password for user identification and security authentication. Other types of access modules can also be used with other types of security measures, including RFID.

The discrete inputs and outputs provides a solution for vehicles that do not use the CAN network. This also provides an input gateway for data processing and provides outputs for relay control of equipment. If a CAN network communication is present the discrete IO keypad is useful for control and monitoring of devices close to the keypad.

The keypad or other access module is preferably weather resistant and secure for exterior mounting. The keypad or other access module is designed to resist water and dust infiltration, and other degradation from cold or hot temperature and UV exposure. The keypad or access module is a CAN module that is used on the exterior of the vehicle. In this way it is an exterior control panel that can address other CAN modules. In addition, the keypad or other access module provides secure functions. Only authorized individuals are allowed to perform vehicle functions. Such security measures can be provided for with access codes or passwords or other technologies such as RFID or biometrics.

Thus, to install and configure the control system associated with a vehicle, software associated with an access module can be configured, based on the type of vehicle or preferences associated with the vehicle. The access module is placed within the vehicle. The access module includes a user input device to allow a user to gain access to the vehicle. Inputs of the access module may be connected to one or more sensors and outputs of the access module are connected to one or more electronic devices such as lights, actuators, or other types of electronic devices. The access module is also electrically connected to the vehicle network, such as a CAN. Thus, the control system can be easily configured and installed within the vehicle.

Wireless communications to the keypad may also be made. An RF expansion module may be used to receive RF transmissions or alternatively an RF transceiver may be integrated into the keypad. Thus, for example a user may be away from the vehicle, such as 100 feet away, and provide inputs that ultimately transmit CAN messages. The present invention contemplates use of BLUETOOTH, Wi-Fi, cellular, or satellite communications to control devices from specific distances depending on the technology used.

Thus, an electronic access system has been disclosed. The present invention contemplates numerous variations in the particular vehicle functions provided, variations in the specific inputs and outputs provided, the communication between controller modules, the number and type of access modules, how the modules are configured, and the types of vehicle used. These and other variations are well within the spirit and scope of the invention.

What is claimed is:

1. A system for providing secured access to a vehicle, comprising:

a vehicle network;

a remote communications device for sending a signal for controlling functions associated with the vehicle;

a receiver electrically connected to the vehicle network and adapted to receive the signal from the remote communications device and send messages over the vehicle network using network protocol to control functions of the vehicle;

an access module adapted to provide control of functions of the vehicle by a user from outside of the vehicle, the access module electrically connected to the vehicle network and configured to send messages over the vehicle network using the network protocol;

a user input device associated with the access module, the access module configured to generate messages to send over the vehicle network using the network protocol based on input received from the user input device;

a plurality of outputs associated with the access module wherein the access module is adapted to directly control access to the vehicle through control of the plurality of outputs;

a plurality of modules electrically connected to the vehicle network wherein each of the modules includes a plurality of inputs for sensing vehicle states and a plurality of outputs for controlling electronic devices;

wherein each of the plurality of modules is configured to send and receive messages of the vehicle network using the network protocol;

wherein the messages comprise (a) a first set of messages reporting state of one or more inputs, (b) a second set of message including commands, each of the commands for controlling at least one of the plurality of outputs, and (c) a third set of messages for changing configurations.

2. The system of claim 1 wherein the user input device is a vehicle-mountable keypad accessible from outside of the vehicle.

3. The system of claim 2 wherein the vehicle-mountable keypad requires entry of a security code prior to controlling functions of the vehicle.

4. The system of claim 1 wherein the remote communications device is housed in a key chain fob.

5. The system of claim 1 further comprising a second access module operatively connected to the vehicle network.

6. The system of claim 1 wherein the plurality of outputs associated with the access module control access associated with a door.

7. The system of claim 6 wherein the plurality of outputs include a door unlock output.

8. The system of claim 6 wherein the plurality of outputs include a window control output.

9. The system of claim 1 wherein the receiver is housed within its own housing.

10. The system of claim 1 wherein the receiver and the access module are integrated and housed within a single housing.

11. The system of claim 1 wherein the vehicle network is a controller area network.

12. A system for providing secured access to a vehicle, comprising:

a remote communications device for sending a signal for controlling a first set of functions associated with the vehicle;

a receiver associated with the vehicle and adapted to receive the signal;

an access module operatively connected to the vehicle and adapted to provide access to control of a second set of functions of the vehicle by a user;

a plurality of actuators disposed within the vehicle and wherein at least a portion of the first set of functions and at least a portion of the second set of functions are associated with at least one of the plurality of actuators;

a controller module electrically connected to the receiver, the access module, and the plurality of actuators; and wherein the second set of functions is configurable using commands for changing programming;

a second access module operatively connected to the vehicle, the second access module electrically connected to the controller module and wherein at least one of the plurality of actuators disposed within the vehicle is associated with a third set of functions, and wherein the second access module is a vehicle mounted keypad accessible from outside the vehicle;

wherein the third set of functions is different from the first and second sets of functions.

13. A configurable system for providing access to a vehicle, comprising:

a vehicle network;

a remote communications device for sending a signal for controlling a first set of vehicle functions;

a receiver associated with the vehicle and adapted to receive the signal, the receiver operatively connected to the vehicle network and configured for sending messages over the vehicle network using a messaging protocol;

an access module operatively connected to the vehicle network and adapted to provide control of a second set of vehicle functions by a user from outside of the vehicle, wherein the access module is adapted to send and receive messages over the vehicle network using the messaging protocol;

wherein the access module includes a plurality of outputs electrically connected to a plurality of electronic devices associated with the vehicle and wherein at least a portion of the first set of functions or at least a portion of the second set of functions are associated with at least one of the plurality of electronic devices, and wherein the access module is configured to receive messages for controlling the plurality of outputs over the vehicle network;

wherein the access module includes a plurality of inputs electrically connected to sensors for monitoring vehicle state and wherein the access module is configured to report on state of the plurality of inputs over the network using the messaging protocol.

14. The system of claim 13 wherein the at least one electronically controlled device is an actuator.

15. The system of claim 14 wherein the vehicle functions include locking a first door and unlocking the first door using the actuator.

16. The system of claim 13 wherein the vehicle functions include opening a first compliment using the actuator.

17. The system of claim 13 wherein the vehicle functions include switching a light on or off.

18. The system of claim 13 further comprising a second access module for providing a third set of vehicle functions, the second access module electrically connected to the vehicle network.

19. The system of claim 13 wherein at least one sensor is adapted for detecting whether a door is open or closed.

20. The system of claim 13 wherein at least one sensor is adapted for detecting whether a window is open or closed.

21. The system of claim 13 wherein at least one sensor is adapted for detecting that a vehicle engine is running.

22. The system of claim 13 wherein at least one sensor is adapted for detecting that a key is in the ignition.

23. An expandable and configurable system for providing secured access to and control of a vehicle, comprising:

a vehicle network;

a receiver electrically connected to the vehicle network and configured to send messages over the vehicle network;

a plurality of vehicle-mountable keypad modules, each of the plurality of vehicle-mountable keypad modules electrically connected to the vehicle network and configured to send messages over the vehicle network;

at least one controller module electrically connected to the vehicle network and configured to communicate with each of the plurality of vehicle mountable keypad modules and adapted to communicate with additional controller modules or keypad modules through messaging over the vehicle network to thereby provide expandability;

wherein each of the plurality of vehicle mountable keypad modules is adapted to receive a user-entered security code to provide access to controlling a set of functions and then receive at least one separately entered code for selecting at least one of the set of functions to control after access is provided;

wherein the messages comprise (a) a first set of messages reporting state of one or more inputs, (b) a second set of message including commands for controlling at least one output, and (c) a third set of messages for changing configurations, the configurations including (1) whether or not a security code is needed for controlling the set of functions, (2) the security code, and (3) network configuration.

24. The expandable and configurable system of claim 23 wherein the set of functions is designated by the security code.

25. The expandable and configurable system of claim 23 wherein the set of functions is designated by location of the vehicle mountable keypad module.

26. The expandable and configurable system of claim 23 further comprising a plurality of zones associated with the vehicle, each of the plurality of zones comprising one or more devices from the set consisting of at least one switch, at least one sensor, and at least one actuator.

27. The expandable and configurable system of claim 23 wherein the set of functions includes functions associated with at least one of the plurality of zones.

28. The expandable and configurable system of claim 23 wherein each of the vehicle mountable keypad modules communicates with the controller module via a multiplexing messaging protocol.

29. The expandable and configurable system of claim 23 wherein the set of functions is configurable without rewiring.

30. An expandable and configurable system for providing secured access to and control of a vehicle, comprising:

a vehicle network;

a plurality of access modules, each of the access modules electrically connected to the vehicle network and configured to send and receive messages over the vehicle network using a network protocol;

wherein each of the plurality of access modules includes (a) an input device for receiving input from a user, (b) at least one input from a sensor of the vehicle, and (c) at least one output to control an electronic device associated with the vehicle; and a receiver electrically connected to the vehicle network and adapted to send messages over the vehicle network;

wherein the messages comprise (a) a first set of messages reporting state of one or more inputs, (b) a second set of message including commands for controlling at least one output, and (c) a third set of messages for changing configurations.

31. The system of claim 30 wherein the network is a controller area network.

* * * * *

UNITED STATES PATENT AND TRADEMARK OFFICE

CERTIFICATE OF CORRECTION

PATENT NO. : 8,350,669 B2
APPLICATION NO. : 11/532581
DATED : January 8, 2013
INVENTOR(S) : Dave S. Magner It is certified that error appears in the above-identified patent and that said Letters Patent is hereby corrected as shown below:

Col. 13, Claim 1, line 10:
after “using” insert -- a --.

Col. 14, Claim 13, line 34:
before “wherein” insert -- and --.

Col. 14, Claim 16, line 57:
“compliment” should read -- compartment --.

Signed and Sealed this
Twenty-sixth Day of February, 2013

Teresa Stanek Rea
*Acting Director of the United States Patent and Trademark Office*